(12) United States Patent
Zhang et al.

(10) Patent No.: US 11,538,540 B2
(45) Date of Patent: Dec. 27, 2022

(54) INFORMATION TAMPER-RESISTANT SYSTEM AND METHOD

(71) Applicant: MONTAGE TECHNOLOGY (KUNSHAN) CO., LTD., Jiangsu (CN)

(72) Inventors: Xiong Zhang, Jiangsu (CN); Gang Shi, Jiangsu (CN)

(73) Assignee: Montage Technology (Kunshan) Co., Ltd., Jiangsu (CN)

(*) Notice: Subject to any disclaimer, the term of this patent is extended or adjusted under 35 U.S.C. 154(b) by 0 days.

(21) Appl. No.: 16/959,148

(22) PCT Filed: May 12, 2020

(86) PCT No.: PCT/CN2020/089728
§ 371 (c)(1),
(2) Date: Jun. 30, 2020

(87) PCT Pub. No.: WO2021/128703
PCT Pub. Date: Jul. 1, 2021

(65) Prior Publication Data
US 2022/0319621 A1 Oct. 6, 2022

(30) Foreign Application Priority Data
Dec. 24, 2019 (CN) .......................... 201911347188.6

(51) Int. Cl.
G11C 7/00 (2006.01)
G11C 17/16 (2006.01)
G11C 16/26 (2006.01)
G11C 16/22 (2006.01)
G11C 17/18 (2006.01)

(52) U.S. Cl.
CPC .............. *G11C 17/16* (2013.01); *G11C 16/22* (2013.01); *G11C 16/26* (2013.01); *G11C 17/18* (2013.01)

(58) Field of Classification Search
CPC ....... G11C 17/18; G11C 17/16; G11C 29/785; G11C 17/165; G11C 29/027
USPC .......................................... 365/225.7, 185.22
See application file for complete search history.

(56) References Cited

U.S. PATENT DOCUMENTS 8,400,863 B1 * 3/2013 Tan ........................ G11C 8/12
365/230.06
2015/0380103 A1 * 12/2015 Braun ................... G11C 17/16
365/96

* cited by examiner

Primary Examiner — Son T Dinh

(57) ABSTRACT

The present disclosure provides an information tamper-resistant system and method. The system includes: a storage module; a writing module connected with the storage module through a first OTP switch, to write source information to the storage module; a first reading module connected with the storage module through a second OTP switch, to read out written information in the storage module and disconnect the first OTP switch and the second OTP switch after confirming that the written information is accurate; and a second reading module connected with the storage module through a third OTP switch, to read out information stored in the storage module after the third OTP switch is switched on; the first OTP switch, the second OTP switch, and the third OTP switch can only perform one switch-on operation or one switch-off operation. The system and method effectively avoid theft and tampering of information.

14 Claims, 3 Drawing Sheets

INFORMATION TAMPER-RESISTANT SYSTEM AND METHOD

CROSS REFERENCE TO RELATED APPLICATION

This is a Sect. 371 National Stage of PCT International Application No. PCT/CN2020/089728, filed on 12 May 2020, which claims priority of a Chinese Patent Application No. 2019113471886 filed on 24 Dec. 2019, the contents of which are incorporated herein by reference in its entirety.

BACKGROUND

Field of Disclosure

The present disclosure relates to the technical field of information security, in particular, to an information tamper-resistant system and method.

Background

With the rapid development of information technology, the secure transmission of information has received increasing attention. Once the information in the transmission process is stolen or tampered, the subsequent process cannot be carried out, and the immeasurable loss may be caused. In particular, in the chip manufacturing process, there is a hidden danger that the security information of the chip may be stolen and/or tampered at the stage from wafer taping, packaging, testing to using by end users, which seriously affects the availability of the chip.

In the prior art, information tampering is usually avoided through signatures, encryption, and the like. For example, a conventional method for preventing information tampering, applied to device servers includes: receiving identification information, an application public key, and a first signature sent by an application server, the identification information is an identification information of a device terminal, the application public key is generated by the device terminal and sent to the application server, the first signature is obtained by the device terminal to sign the application public key using a device private key in a trusted execution environment, the information stored in the trusted execution environment cannot be modified by an untrusted application program; obtaining a device public key by searching for a public key corresponding to the device private key according to the identification information, the device public key corresponds to the device private key stored in the device terminal; if the first signature is verified by using the device public key, the verification result is sent to the application server. As another example, a conventional information tamper-resistant method includes: generating a random key when a request for writing information of built-in information by an authorized information modification tool is detected and the modification operation of the built-in information requires authorization; obtaining a first encrypted data by using a preset public key to encrypt the random key and information to be written, and transmitting the first encrypted data to a server through the information modification tool, so that the server generates a second encrypted data according to the first encrypted data; and obtaining the second encrypted data, obtaining the information to be written by decrypting the second encrypted data using the random key, and modifying the built-in information according to the information to be written.

However, the above information tamper-resistant methods have the following disadvantages:

(1) the algorithms of the methods are complex, and have high hardware requirements on the systems;

(2) many system resources are occupied, and application scenarios are limited.

SUMMARY

In view of the above-mentioned shortcomings, the present disclosure provides an information tamper-resistant system and method, which uses a One Time Programmable (OTP) switch to control writing and reading of information for a limited number of times, which effectively avoids the theft and tampering of information.

The present disclosure provides an information tamper-resistant system. The system includes: a storage module; a writing module connected with the storage module through a first OTP switch, to write source information to the storage module; a first reading module connected with the storage module through a second OTP switch, to read out written information in the storage module to verify whether the written information is consistent with the source information, the first OTP switch and the second OTP switch are permanently switched off after confirming that the written information is consistent with the source information; and a second reading module connected with the storage module through a third OTP switch, to read out information stored in the storage module after the third OTP switch is switched on; the first OTP switch, the second OTP switch, and the third OTP switch can only perform one switch-on operation or one switch-off operation.

In an embodiment of the present disclosure, the system is applied in manufacturing and using processes of a chip, and security information of the chip is used as the source information; the writing module writes the source information to the storage module during a Chip Probe (CP) or Final Test (FT) process of the chip; the first reading module reads out written information in the storage module during the CP or FT process of the chip to verify whether the written information is consistent with the source information, and the first OTP switch and the second OTP switch are permanently switched off after the written information is confirmed to be consistent with the source information; and the second reading module reads out the information stored in the storage module after the third OTP switch is switched on during a using phase of the chip.

In an embodiment of the present disclosure, the writing module further generates a first hash code according to the source information; the second reading module further generates a second hash code according to the stored information, and compares the first hash code with the second hash code to determine whether the source information is consistent with the stored information.

In an embodiment of the present disclosure, the first reading module and the second reading module are integrated as a whole, and are connected with the storage module through the second OTP switch and the third OTP switch.

In an embodiment of the present disclosure, the storage module is an OTP storage module or an MTP storage module.

In an embodiment of the present disclosure, the first OTP switch and the second OTP switch are switched on at the initial state; the third OTP switch is switched off at the initial state.

In an embodiment of the present disclosure, the first OTP switch, the second OTP switch, and the third OTP switch all use an efuse memory.

Correspondingly, the present disclosure provides an information tamper-resistant method, the method is applied to an information tamper-resistant system, the information anti-tampering system includes a storage module, a writing module, a first reading module and a second reading module; the writing module, the first reading module and the second reading module are connected with the storage module through a first OTP switch, a second OTP switch, and a third OTP switch, respectively.

The method includes: writing, by the writing module, source information into the storage module through the first OTP switch; reading out, by the first reading module, written information in the storage module through the second OTP switch to verify whether the written information is consistent with the source information and permanently switching off the first OTP switch and the second OTP switch after confirming that the written information is consistent with the source information; and reading out, by the second reading module, information stored in the storage module after the second OTP switch is switched on; the first OTP switch, the second OTP switch, and the third OTP switch only perform one switch-on operation or one switch-off operation.

In an embodiment of the present disclosure, the method is applied in manufacturing and using processes of a chip, and security information of the chip is used as the source information, the method includes: writing, by the writing module, the source information to the storage module in a Chip Probe (CP) or Final Test (FT) process of the chip; reading out, by the first reading module, written information in the storage module during the CP or FT process of the chip to verify whether the written information is consistent with the source information, and permanently switching off the first OTP switch and the second OTP switch after the written information is confirmed to be consistent with the source information; and reading out, by the second reading module, the information stored in the storage module after the third OTP switch is switched on during a using phase of the chip.

In an embodiment of the present disclosure, the method further includes: generating, by the writing module, a first hash code according to the source information; generating, by the second reading module, a second hash code according to the stored information; and comparing the first hash code with the second hash code to determine whether the source information is consistent with the stored information.

In an embodiment of the present disclosure, the first reading module and the second reading module are integrated as a whole, and are connected with the storage module through the second OTP switch and the third OTP switch.

In an embodiment of the present disclosure, the storage module is an OTP storage module or an MTP storage module.

In an embodiment of the present disclosure, the first OTP switch and the second OTP switch are switched on at the initial state; the third OTP switch is switched off at the initial state.

In an embodiment of the present disclosure, the first OTP switch, the second OTP switch, and the third OTP switch all use an efuse memory.

The information tamper-resistant system and method of the present disclosure realize the secure writing and reading of information by using OTP switches, and guarantee the security of information transmission through a hash encryption algorithm, which can effectively avoid and prevent information from being stolen and tampered in all processes from wafer manufacturing to end users, the requirements on hardware configuration are low, and the application scenarios are diverse.

DESCRIPTION OF REFERENCE NUMERALS

Figure 1:
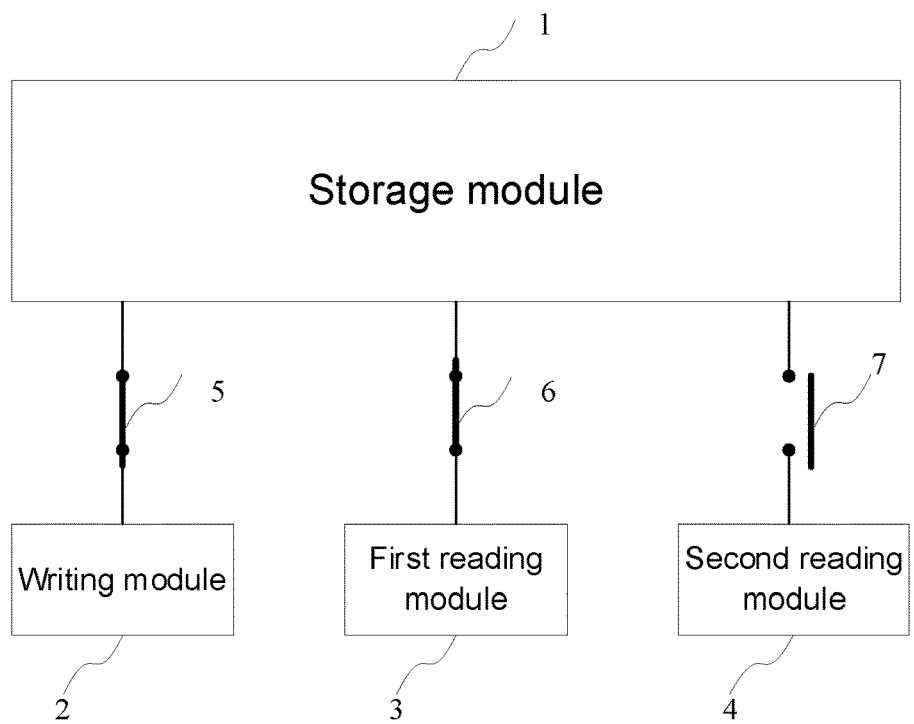
FIG. 1 shows a schematic view of an information tamper-resistant system according to an embodiment of the present disclosure.

1 Storage module
2 Writing module
3 First reading module
4 Second reading module
5 First OTP switch
6 Second OTP switch
7 Third OTP switch

DETAILED DESCRIPTION OF THE PREFERRED EMBODIMENTS

The embodiments of the present disclosure will be described below through exemplary embodiments. Those skilled in the art can easily understand other advantages and effects of the present disclosure according to contents disclosed by the specification. The present disclosure can also be implemented or applied through other different exemplary embodiments. Various modifications or changes can also be made to all details in the specification based on different points of view and applications without departing from the spirit of the present disclosure. It needs to be stated that the following embodiments and the features in the embodiments can be combined under the situation of no conflict.

It needs to be stated that the drawings provided in the following embodiments are just used for schematically describing the basic concept of the present disclosure, thus only illustrating components only related to the present disclosure and are not drawn according to the numbers, shapes, and sizes of components during actual implementation, the configuration, number and scale of each component during the actual implementation thereof may be freely changed, and the component layout configuration thereof may be more complex.

Referring to FIG. 1, in an embodiment, the information tamper-resistant system of the present disclosure includes a storage module 1, a writing module 2, a first reading module 3, and a second reading module 4. The writing module 2 is connected with the storage module 1 through a first one time programmable (OTP) switch 5, the first reading module 3 is connected with the storage module 1 through a second OTP switch 6, and the second reading module 4 is connected with the storage module 1 through a third OTP switch 7. In the initial state, the first OTP switch 5 and the second OTP switch 6 are both switched on, and the third OTP switch 7 is switched off.

The OTP switch is a switch that can only perform switch-on operation once or switch-off operation once by programming, and the switch-on operation and the switch-off operation are physically irreversible. Specifically, the OTP switch can only be programmed once, and it can be rewritten from 1 to 0 or from 0 to 1. After one rewrite is completed, 0 cannot be rewritten to 1, or 1 cannot be rewritten to 0. In an embodiment of the present disclosure, the first OTP switch, the second OTP switch, and the third OTP switch all use an efuse memory. The efuse memory is similar to Electrically Erasable Programmable Read-only Memory (EEPROM). The difference is that efuse memory is a one-time programmable memory, which is programmed by a fuse. A DC pulse of 10 mA lasting 200 microseconds is enough to program a single fuse. The switch-on and switch-off of the switch can be realized by the on and off of the fuse.

Figure 2:
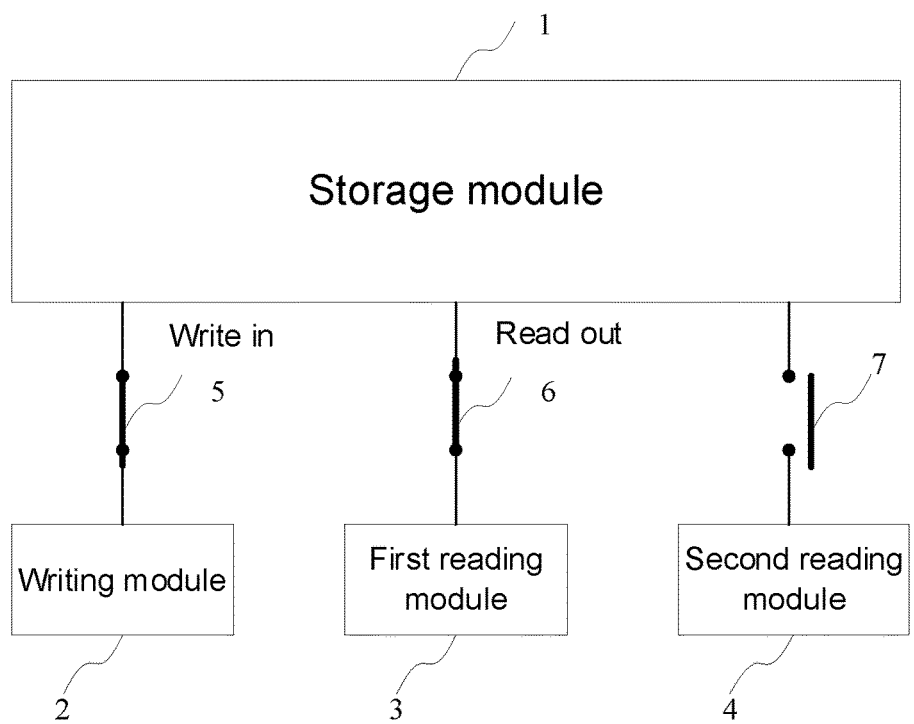
FIG. 2 shows a schematic view of the state of the information tamper-resistant system of the present disclosure during a writing operation.
Figure 3:
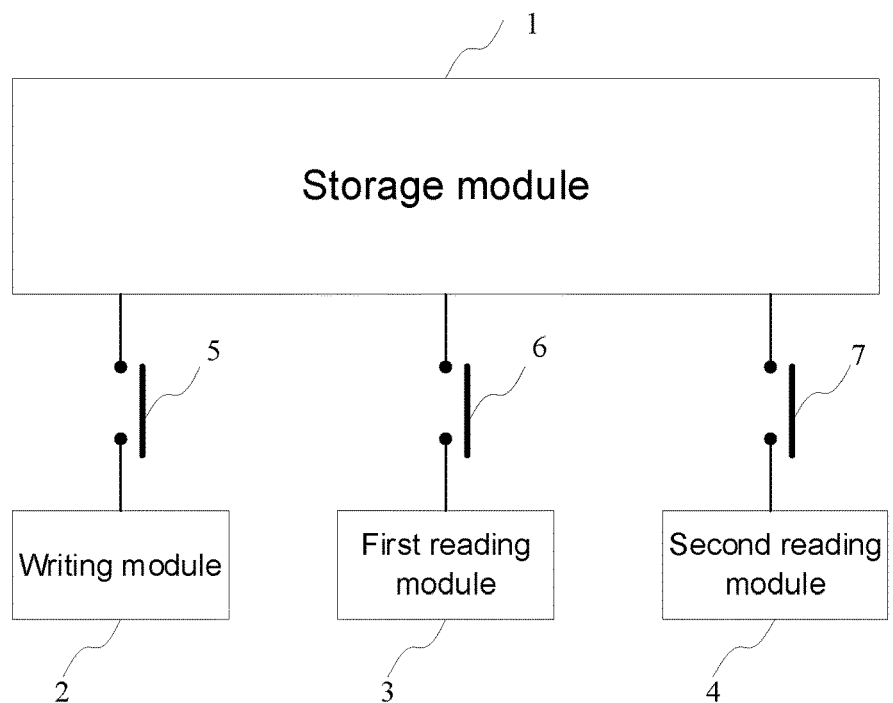
FIG. 3 shows a schematic view of the state of the information tamper-resistant system of the present disclosure during the first reading operation.

Referring to FIG. 2, when writing of information is required, since the first OTP switch 5 is in a switch-on state, the writing module 2 directly writes source information to the storage module 1. At the same time, since the second OTP switch 6 is also in a switch-on state, the first reading module 3 directly reads out the written information from the storage module 1, to verify whether the written information is consistent with the source information. Referring to FIG. 3, if the written information is consistent with the source information, it means that the write operation is correct, and the first OTP switch 5 and the second OTP switch 6 are permanently switched off. If the written information is inconsistent with the source information, it indicates that the write operation is incorrect, the source information can be rewritten based on the write module 2, the written information can be read based on the first read module 3 until the source information is consistent with the written information, and then the first OTP switch 5 and the second OTP switch 6 are permanently switched off. Through the above operations, accurate writing of the source information can be ensured, and because the first OTP switch 5 and the second OTP switch 6 are permanently switched off, the storage module 1 cannot be written again, thereby avoiding tampering and theft of information.

Figure 4:
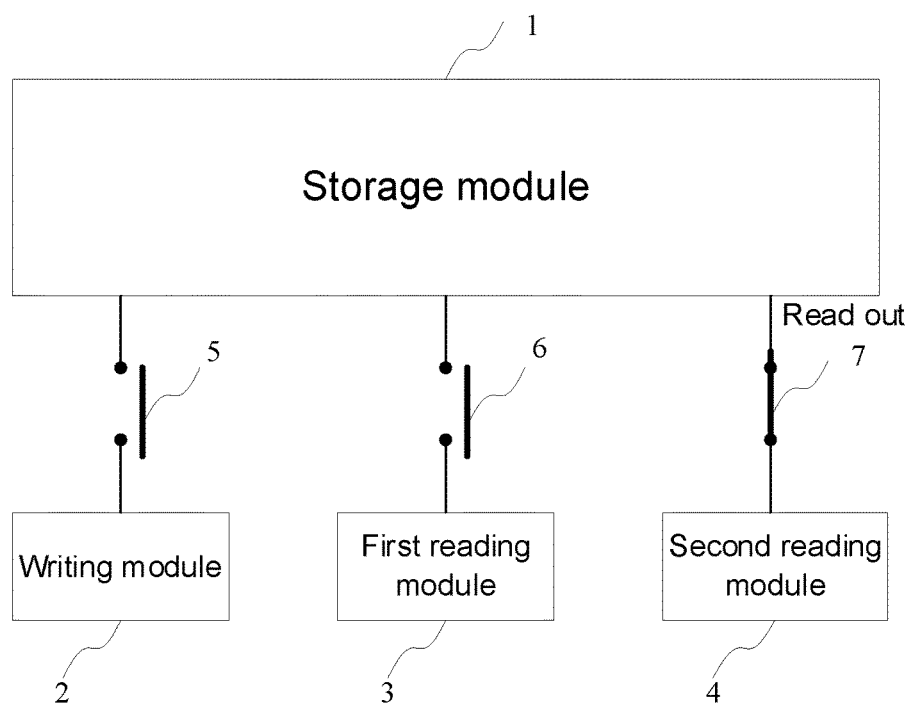
FIG. 4 shows a schematic view of the state of the information tamper-resistant system of the present disclosure during the second reading operation.

Referring to FIG. 4, when the information stored in the storage module 1 needs to be read out, since the third OTP switch 7 is in an switch-off state, the third OTP switch 7 needs to be switched on first, then the information stored in the storage module 1 is read out from the storage module 1 through the second reading module 4. Since the third OTP switch 7 can be switched on only once, the information in the storage module 1 can be read out only once, thereby effectively avoiding the theft of information. If the third OTP switch 7 has been switched on before reading the stored information, it can be proved that the stored data in the storage module 1 is illegally read.

In particular, in the manufacturing process of chips, the security information of the chip directly affects the availability of the chip itself, so the information needs to be transmitted securely. In the manufacturing and using processes of chips, the chips are delivered to end users after Chip Probe (CP) test, packaging, and Final Test (FT). The CP test is testing the chip at the wafer stage before packaging. The FT is a test performed after the packaging is completed. In an embodiment of the present disclosure, the information tamper-resistant system of the present disclosure is used in chip manufacturing and using processes. The security information of the chip is used as the source information. The writing module is used to write the source information to the storage module in the CP or FT stage of the chip. The first reading module is used to read out the written information in the storage module during the CP or FT process of the chip, and switch off the first OTP switch and the second OTP switch after confirming that the written information is accurate. The second reading module is used to read out the information stored in the storage module after the third OTP switch is switched on during the using phase of the chip. Therefore, the security information can be accurately written in through the first OTP switch and the second OTP switch in the CP process or the FT process of the chip, and the security information can only be read out at the end user through the third OTP switch. This method can monitor and confirm whether there is illegal writing of information in the previous processes (wafer manufacturing process, transportation process, etc.) when writing and confirming information at CP or FT stage. At the end user, all processes (packaging, transportation, initialization, etc.) after CP or FT until delivered to the end user can be monitored for information tampering, and the theft of information in all intermediate processes is prevented, and the purpose of anti-theft and tamper-resistance is achieved.

In order to further ensure the security of the transmission of the source information in the information tamper-resistant system of the present disclosure, in an embodiment of the present disclosure, the writing module 2 is further configured to generate a first hash code according to the source information. The second reading module 4 is further configured to generate a second hash code according to the stored information, and compare the first hash code with the second hash code to determine whether the source information is consistent with the stored information. That is to say, when writing the source information, the writing module 2 first converts the source information into a corresponding hash code through a hash encryption algorithm. The hash encryption algorithm can convert an input of any length into a fixed-length output through a hash algorithm, and the output is a hash value. This conversion is a compression map, that is, the space of the hash value is usually much smaller than that of the input. The source data can be compressed into a unique first hash code through the hash encryption function. After reading the stored information, the second reading module 4 also uses the hash encryption algorithm to encrypt the stored information, and then obtains the second hash code. The first hash code is transmitted to the end user in plain text, and the second hash code is generated at the end user. By comparing the first hash code and the second hash code, it can be determined whether the stored information is consistent with the source information. If the stored information is consistent with the source information, it means that the source information is transmitted accurately and without tampering. If the stored information is inconsistent with the source information, it indicates that the source information has been tampered with.

In an embodiment of the present disclosure, the first reading module 3 and the second reading module 4 may be integrated as a whole, and be connected with the storage module 1 through the second OTP switch 6 and the third OTP switch 7. That is to say, the information tamper-resistant system only needs one reading module, which has the function of reading data twice, once to verify the accuracy of the written information, and once to read the stored information. The above structure further simplifies the system architecture and reduces costs.

In an embodiment of the present disclosure, the storage module 1 uses an OTP storage module or a Multi Time Program (MTP) storage module or a flash storage module, which can be selected according to different application scenarios.

Figure 5:
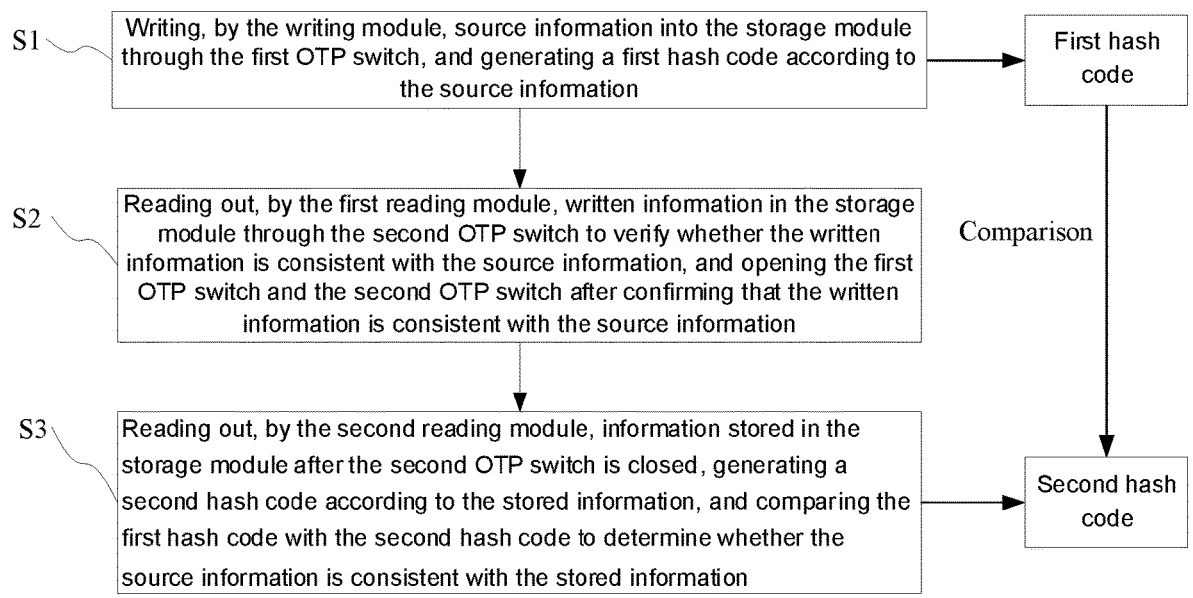
FIG. 5 shows a flow chart of an information tamper-resistant method according to an embodiment of the present disclosure.

Referring to FIG. 5, in an embodiment, the information tamper-resistant method of the present disclosure is applied to an information tamper-resistant system. The information tamper-resistant system includes a storage module, a writing module, a first reading module, and a second reading module. The writing module, the first reading module and the second reading module are connected with the storage module through a first OTP switch, a second OTP switch, and a third OTP switch, respectively. In the initial state, the first OTP switch and the second OTP switch are both switched on, and the third OTP switch is switched off.

The information tamper-resistant method includes the following steps:

Step S1: writing, by the writing module, source information into the storage module through the first OTP switch.

Referring to FIG. 2, when writing of information is required, since the first OTP switch is in a switch-on state, the writing module directly writes source information to the storage module.

Step S2: reading out, by the first reading module, written information in the storage module through the second OTP switch to verify whether the written information is consistent with the source information, and disconnecting the first OTP switch and the second OTP switch after confirming that the written information is consistent with the source information.

At the same time, since the second OTP switch 6 is also in a switch-on state, the first reading module directly reads out the written information in the storage module from the storage module, to verify whether the written information is consistent with the source information. Referring to FIG. 3, if the written information is consistent with the source information, it means that the write operation is correct, and the first OTP switch and the second OTP switch are permanently switched off. If the written information is inconsistent with the source information, it indicates that the write operation is incorrect, the source information can be rewritten based on the write module, the written information can be read based on the first read module until the source information is consistent with the written information, and the first OTP switch and the second OTP switch are permanently switched off. Through the above operations, accurate writing of the source information can be ensured, and because the first OTP switch and the second OTP switch are permanently switched off, the storage module cannot be written again, thereby avoiding tampering and theft of information.

Step S3: reading out, by the second reading module, information stored in the storage module after the second OTP switch is switched on.

Referring to FIG. 4, when the information stored in the storage module needs to be read out, since the third OTP switch is in an switch-off state, the third OTP switch needs to be switched on first, then the information stored in the storage module is read out from the storage module through the second reading module. Since the third OTP switch can be switched on only once, the information in the storage module can be read out only once, thereby effectively avoiding the theft of information. If the third OTP switch has been switched on before reading the stored information, it can be proved that the stored data in the storage module is illegally read.

In particular, in the manufacturing process of chips, the security information of the chip directly affects the availability of the chip itself, the information it needs to be transmitted securely. In the manufacturing and using processes of chips, the chips are delivered to the end user after Chip Probe (CP) test, packaging, and Final Test (FT). The CP test is testing the chip at the wafer stage before packaging. The FT is a test performed after the packaging is completed. In an embodiment of the present disclosure, the information tamper-resistant system of the present disclosure is used in chip manufacturing and using processes. The security information of the chip is used as the source information. The writing module writes the source information to the storage module in a Chip Probe (CP) or Final Test (FT) stage of the chip. The first reading module reads out written information in the storage module during the CP or FT process of the chip, and switches off the first OTP switch and the second OTP switch after confirming that the written information is accurate. The second reading module reads out the information stored in the storage module after the third OTP switch is switched on during a using phase of the chip. Therefore, the security information can be accurately written in through the first OTP switch and the second OTP switch in the CP process or the FT process of the chip, and the security information can only be read out at the end user through the third OTP switch. This method can monitor and confirm whether there is illegal writing of information in the previous processes (wafer manufacturing process, transportation process, etc.) when writing and confirming information at CP or FT stage. At the end user, all processes (packaging, transportation, initialization, etc.) after CP or FT until delivered to the end user can be monitored for information tampering, and the theft of information in all intermediate processes is prevented, and the purpose of anti-theft and tamper-resistance is achieved.

In order to further ensure the security of the transmission of the source information in the information tamper-resistant system of the present disclosure, in an embodiment of the present disclosure, the writing module further generates a first hash code according to the source information. The second reading module further generates a second hash code according to the stored information, and compares the first hash code with the second hash code to determine whether the source information is consistent with the stored information. That is to say, when writing the source information, the writing module first converts the source information into a corresponding hash code through a hash encryption algorithm. The hash encryption algorithm can convert an input of any length into a fixed-length output through a hash algorithm, and the output is a hash value. This conversion is a compression map, that is, the space of the hash value is usually much smaller than the input space. The source data can be compressed into a unique first hash code through the hash encryption function. After reading the stored information, the second reading module also uses the hash encryption algorithm to encrypt the stored information, and then obtains the second hash code. The first hash code is transmitted to the end user in plain text, and the second hash code is generated at the end user. By comparing the first hash code and the second hash code, it can be determined whether the stored information is consistent with the source information. If the stored information is consistent with the source information, it means that the source information is transmitted accurately and without tampering. If the stored information is inconsistent with the source information, it indicates that the source information has been tampered with.

In an embodiment of the present disclosure, the first reading module and the second reading module may be integrated, and be connected with the storage module through the second OTP switch and the third OTP switch. That is to say, the information tamper-resistant system only needs one reading module, which has the function of reading data twice, once to verify the accuracy of the written information, and once to read the stored information. The above structure further simplifies the system architecture and reduces costs.

In an embodiment of the present disclosure, the storage module uses an OTP storage module or a Multi Time Program (MTP) storage module or a flash storage module, which can be selected according to different application scenarios.

In summary, the information tamper-resistant system and method of the present disclosure control the writing and reading of information for a limited number of times by using OTP switches. The security of information transmission is ensured through the hash encryption algorithm. The requirements for hardware configuration are low, and the application scenarios are diverse. It effectively avoids theft and tampering of information and guarantees the safe transmission of information. Therefore, the present disclosure effectively overcomes various shortcomings in the existing technology and has high industrial utilization value.

The above-mentioned embodiments are just used for exemplarily describing the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the claims of the present disclosure.

We claim:

1. An information tamper-resistant system, comprising:
    a storage module;
    a writing module connected with the storage module through a first one time programmable (OTP) switch and configured to write source information to the storage module;
    a first reading module connected with the storage module through a second OTP switch and configured to read out written information in the storage module to verify whether the written information is consistent with the source information, wherein the first OTP switch and the second OTP switch are permanently switched off after confirming that the written information is consistent with the source information; and
    a second reading module connected with the storage module through a third OTP switch, to read out information stored in the storage module after the third OTP switch is switched on;
    wherein the first OTP switch, the second OTP switch, and the third OTP switch can only perform one switch-on operation or one switch-off operation.

2. The information tamper-resistant system according to claim 1, wherein
    the system is applied in manufacturing and using processes of a chip, and security information of the chip is used as the source information;
    the writing module is configured to write the source information to the storage module during a Chip Probe (CP) or Final Test (FT) process of the chip;
    the first reading module is configured to read out written information in the storage module during the CP or FT process of the chip to verify whether the written information is consistent with the source information, and the first OTP switch and the second OTP switch are permanently switched off after the written information is confirmed to be consistent with the source information; and
    the second reading module is configured to read out the information stored in the storage module after the third OTP switch is switched on during a using phase of the chip.

3. The information tamper-resistant system according to claim 2, wherein the writing module is further configured to generate a first hash code according to the source information; the second reading module is further configured to generate a second hash code according to the stored information, and compare the first hash code with the second hash code to determine whether the source information is consistent with the stored information.

4. The information tamper-resistant system according to claim 2, wherein the first reading module and the second reading module are integrated as a whole, and are connected with the storage module through the second OTP switch and the third OTP switch.

5. The information tamper-resistant system according to claim 2, wherein the storage module is an OTP storage module or an MTP storage module.

6. The information tamper-resistant system according to claim 2, wherein the first OTP switch and the second OTP switch are switched on at the initial state; the third OTP switch is switched off at the initial state.

7. The information tamper-resistant system according to claim 2, wherein the first OTP switch, the second OTP switch, and the third OTP switch all use an efuse memory.

8. An information tamper-resistant method, wherein the method is applied to an information tamper-resistant system, the information anti-tampering system includes a storage module, a writing module, a first reading module and a second reading module; the writing module, the first reading module and the second reading module are connected with the storage module through a first OTP switch, a second OTP switch, and a third OTP switch, respectively;
    the method comprises:
        writing, by the writing module, source information into the storage module through the first OTP switch;
        reading out, by the first reading module, written information in the storage module through the second OTP switch to verify whether the written information is consistent with the source information, and permanently switching off the first OTP switch and the second OTP switch after confirming that the written information is consistent with the source information; and
        reading out, by the second reading module, information stored in the storage module after the second OTP switch is switched on;
        wherein the first OTP switch, the second OTP switch, and the third OTP switch only perform one switch-on operation or one switch-off operation.

9. The information tamper-resistant method according to claim 8, wherein
    the method is applied in manufacturing and using processes of a chip, and security information of the chip is used as the source information, the method includes:

writing, by the writing module, the source information to the storage module in a Chip Probe (CP) or Final Test (FT) process of the chip;

reading out, by the first reading module, written information in the storage module during the CP or FT process of the chip to verify whether the written information is consistent with the source information, and permanently switching off the first OTP switch and the second OTP switch after the written information is confirmed to be consistent with the source information; and reading out, by the second reading module, the information stored in the storage module after the third OTP switch is switched on during a using phase of the chip.

10. The information tamper-resistant method according to claim 8, wherein the method further includes:

generating, by the writing module, a first hash code according to the source information;

generating, by the second reading module, a second hash code according to the stored information; and comparing the first hash code with the second hash code to determine whether the source information is consistent with the stored information.

11. The information tamper-resistant method according to claim 9, wherein the first reading module and the second reading module are integrated as a whole, and are connected with the storage module through the second OTP switch and the third OTP switch.

12. The information tamper-resistant method according to claim 9, wherein the storage module is an OTP storage module or an MTP storage module.

13. The information tamper-resistant method according to claim 9, wherein the first OTP switch and the second OTP switch are switched on at the initial state; the third OTP switch is switched off at the initial state.

14. The information tamper-resistant method according to claim 9, wherein the first OTP switch, the second OTP switch, and the third OTP switch all use an efuse memory.

* * * * *